June 6, 1967 E. H. LAND 3,323,431
COMPARISON PHOTOMETER
Filed April 13, 1964 6 Sheets-Sheet 1

INVENTOR.
Edwin H. Land
BY Brown and Mikulka
and
Donald M. Sandler
ATTORNEYS

TRANSMISSION DENSITY PATTERN "A"

TRANSMISSION DENSITY PATTERN "B"

SOURCE "B" BRIGHTER THAN SOURCE "A"

PHOTOMETRIC BALANCE

SOURCE "B" LESS BRIGHT THAN SOURCE "A"

June 6, 1967 E. H. LAND 3,323,431
COMPARISON PHOTOMETER
Filed April 13, 1964 6 Sheets-Sheet 3

INVENTOR.
Edwin H. Land
BY Brown and Mikulka
and
Donald M. ———
ATTORNEYS

June 6, 1967 E. H. LAND 3,323,431
COMPARISON PHOTOMETER
Filed April 13, 1964 6 Sheets-Sheet 4

INVENTOR.
Edwin H. Land
BY Brown and Mikulka
and
Donald M. Sandler

INVENTOR.
Edwin H. Land
BY Brown and Mikulka
and
Donald N. Sandler
ATTORNEYS (a)

(b)

United States Patent Office 3,323,431
Patented June 6, 1967

3,323,431
COMPARISON PHOTOMETER
Edwin H. Land, Cambridge, Mass., assignor to Polaroid Corporation, Cambridge, Mass., a corporation of Delaware
Filed Apr. 13, 1964, Ser. No. 359,116
17 Claims. (Cl. 95—10)

This invention relates to photometric devices by which the brightness of two sources can be compared, and more particularly to a device of the type described which provides a positive visual indication to the observer when photometric balance is achieved.

Conventional comparison photometers involve bringing a light source of unknown brightness into a common field of view with a light source of known and controllable brightness. When the sources are photometrically unbalanced, light and dark areas are defined, the boundary between which is sharp and easily discernible. At balance, the field appears uniformly bright and the boundary between the areas disappears. Thus, the precise point of interest is marked by the disappearance of a pattern defined by contrasting levels of brightness. While such disappearance indicates photometric balance, it is a negative indication apparent to an observer only because he knows that imbalance in one direction produces a pattern of light and dark areas that reverses on passing through balance. For obvious reasons, it would be highly desirable to provide a positive indication to an observer that balance has been achieved.

It is therefore the primary object of the present invention to provide a comparison photometer wherein an intelligible pattern in contrasting levels of brightness appears to an observer when the brightness of the two sources has a predetermined relationship (e.g., equality), and an unintelligible pattern in contrasting levels of brightness appears when the brightness of the sources has any other relationship.

Briefly, the present invention requires light from each of two independent uniformly illuminated source areas to be viewed in a common field through separate fixed visible patterns that are in registration. The configuration of the composite pattern thus formed is dependent, not only on the configuration of the fixed patterns, but on the polarity and magnitude of the photometric imbalance existing between the brightness of the two source areas. Where the magnitude of the imbalance is zero, the brightness of the source areas is equal. By using properly designed fixed patterns, the composite pattern will define a preselected configuration (or index) at a given value of photometric imbalance. Moreover, a visual indication that such value of imbalance has been reached is provided when the index is there uniquely intelligible, but concealed or camouflaged and made unintelligible when a change in the imbalance produces a changed configuration. Selection of fixed patterns which cause an index to be intelligible only at photometric balance provides a positive indication to an observer that photometric balance has been reached, and will thus achieve the primary object of the present invention.

The more important features of this invention have thus been outlined rather broadly in order that the detailed discription thereof that follows may be better understood, and in order that the contribution to the art may be better appreciated. There are, of course, additional features of the invention that will be described hereinafter and which will also from the subject of the claims appended hereto. Those skilled in the art will appreciate that the conception upon which this disclosure is based may readily be utilized as a basis for designing other structures for carrying out the several purposes of this invention. It is important, therefore, that the claims to be granted herein shall be of sufficient breadth to prevent the appropriation of this invention by those skilled in the art.

For a fuller understanding of the nature and objects of the invention, reference should be had to the following detailed description taken in connection with the accompanying drawings wherein:

FIGURE 1 is an embodiment of the invention wherein a beam-splitter arrangement is utilized for the purpose of projecting into a common field light from a reference source and light from a source whose intensity is to be compared with reference;

FIGS. 2(a) and (b) each represent a pair of patterns individually associated with the two light sources, and having different photographic density patterns thereon, for the purpose of illustrating relative changes in brightness of a composite pattern defined by the individual patterns under different relative relationships between the two light sources;

FIG. 3 is a graph showing the relationship between the densities of the individual patterns necessary to cause the composite pattern to have a uniform density;

FIGS. 4(a) and (b) are examples of transmission density patterns that may be individually associated with the two light sources shown in FIGURE 1;

FIGS. 4(c), (d) and (e) represent the composite pattern formed by the device shown in FIGURE 1 under the three conditions of relative brightness between the two sources;

FIG. 5 is another embodiment of the present invention in which a pair of patterns individually associated with each of two light sources is selectively illuminated by differently polarizing the light from each source;

FIGS. 6(a) and (b) represent a pair of partial polarization patterns that can be individually associated with the light sources of FIG. 5;

FIGS. 6(c), (d) and (e) represent the composite pattern achieved by the apparatus of FIG. 5 and showing the relative brightness between various portions under the three conditions of relative brightness between the two light sources;

Figure 12:
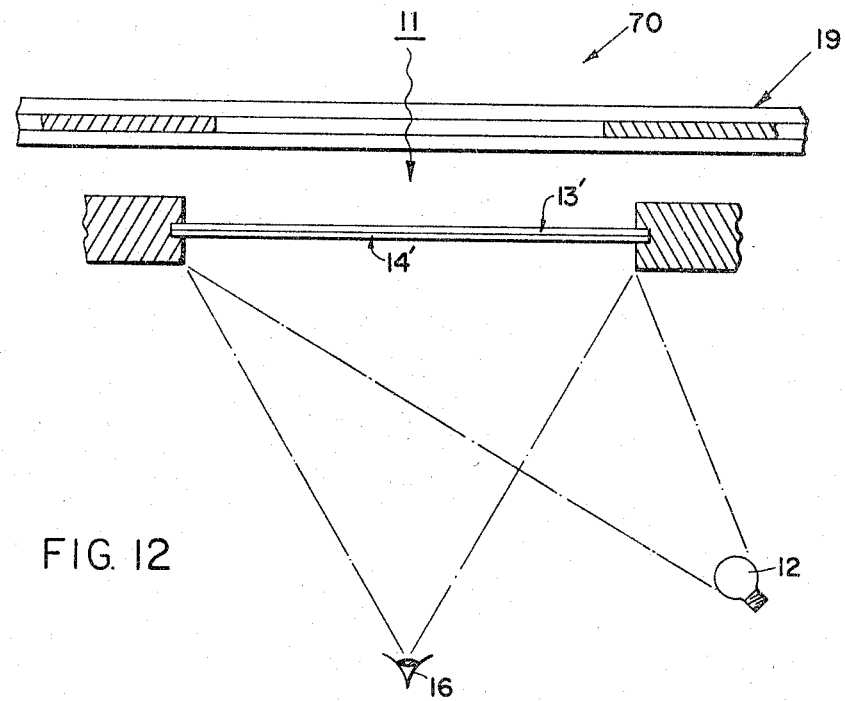

FIG. 12 is a schematic view of yet another embodiment of the present invention in which a reflecting pattern partially covers a background area and is illuminated by one source of light, the background area is illuminated by another source of light and can be seen through the interstices of the pattern; and FIGS. 13(a) and (b) are plan views of the transparent supports of the photometer showing the nature of the index symbol and pattern.

Figure 1:
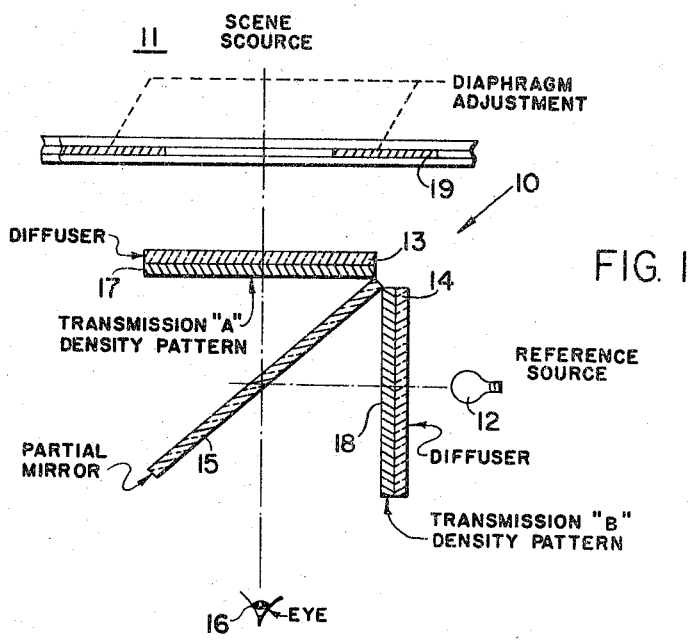

As indicated previously, light from each of two uniformly illuminated source areas must be viewable simultaneously through the use of separate screens that have fixed visible patterns thereon such that the latter are in registration. Embodiment 10, shown in FIGURE 1, provides the fixed patterns in terms of contrasting levels of brightness achieved by a pair of density patterns each of which is arranged on different transparent supports; and provides for their viewing in a common field by utilizing a beam-splitter arrangement. For convenience, a density pattern arranged on a transparent support is referred to hereinafter as a "transmission density pattern." Specifically, embodiment 10 includes two independent sources of light denoted at 11 and 12 and termed scene source and reference source respectively. Diffuser 13 associated with source 11 and diffuser 14 associated with source 12 define two independent light source areas which are uniformly illuminated so that no brightness gradient exists across either diffuser. As indicated in the drawing, beam-splitter 15, in the form of a partial mirror located at 45° relative to each of diffusers 13 and 14, permits an observer at 16 to view, in a common field, diffuser 13 through sheet 17 and diffuser 14 through sheet 18. Each of sheets 17 and 18 have thereon a fixed transmission density pattern, and as a result of the beam-splitter arrangement, the observer sees a composite pattern defined by the fixed transmission density patterns. As will be explained later, the configuration of the composite pattern is dependent, not only on the configuration of the fixed patterns, but on the polarity and magnitude of photometric imbalance existing between diffusers 13 and 14.

In order to control such photometric imbalance, adjustable diaphragm 19, interposed between source 11 and diffuser 13 may be utilized. Selective control by an observer permits the brightness of diffuser 13 to be changed relative to the brightness of diffuser 14. Thus, the construction shown in FIGURE 1 could be utilized for photography purposes wherein source 11 may represent the scene being photographed and source 12 may represent a standard lamp producing, on diffuser 14, a predetermined and fixed level of brightness. The position of the diaphragm at which diffusers 13 and 14 are photometrically balanced would then be a measure of the brightness of the scene to be photographed, and could be used to establish the exposure-value necessary to achieve proper exposure. While the drawing shows attenuation of light from one source by means of a variable diaphragm, it will be understood, of course, that attenuation could also be achieved by controlling the lamp voltage. Therefore, it is intended that the drawing indicate only that the brightness of one source is changeable relative to that of the other source.

Figure 2:
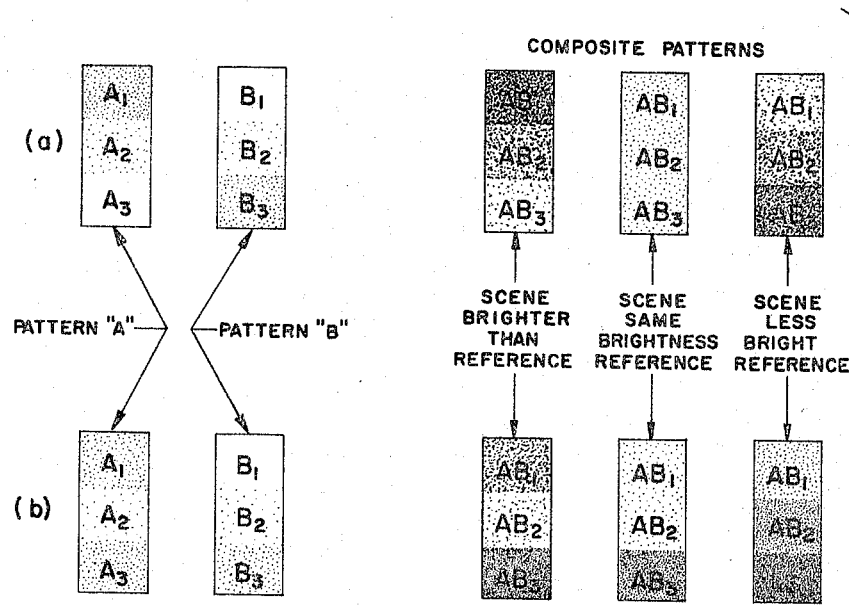

To illustrate how the composite pattern seen by observer 16 depends upon the configuration of the fixed patterns associated with each source and the polarity and magnitude of photometric imbalance existing between the sources, reference is made to FIG. 2(a) where patterns A and B represent transmission density patterns associated individually with diffusers 13 and 14. Patterns A and B are oriented such that when seen by observer 16 in a common field of view, elemental areas $A_1$ and $B_1$ are in optical registration and define composite area $AB_1$ which is a specific portion of the composite pattern. Similarly, elemental areas $A_2$ and $B_2$ are in optical registration and define composite area $AB_2$, etc. The intensity of light $(I_t)_A$ transmitted by an elemental area in pattern A is:

$$(I_t)_A = \frac{(I_i)_A}{10 D_A} \quad (1)$$

where $(I_i)_A$ is the intensity of the light incident on the elemental area and $D_A$ is the photographic density of the latter. Therefore, the total intensity of light seen at a composite area, when the intensity of the light incident on each of the two elemental areas is $I_i$, is:

$$I_t = (I_t)_A + (I_t)_B$$
$$= I_i \left( \frac{1}{10 D_A} + \frac{1}{10 D_B} \right) \quad (2)$$

Figure 3:
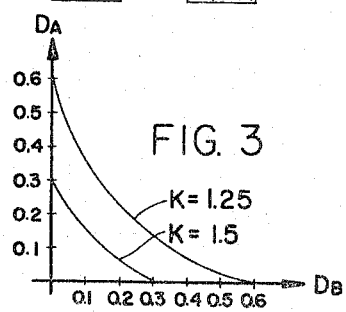

At photometric balance, then, each composite area of the composite pattern, at which the densities of the elemental areas defining such composite area satisfy the relation:

$$\frac{1}{10 D_A} + \frac{1}{10 D_B} = K \quad (3)$$

where $K$=constant, will appear equally bright to an observer. Stated otherwise, the relationship between the densities of elemental areas defining a given composite area is:

$$D_A = D_B - \lg[K 10 D_B - 1] \quad (4)$$

where $(D_A)_{max} = -\lg(K-1)$, $1 < K \leq 2$, and $(D_B)_{min} = 0$. FIG. 3 shows a plot of Eq. 4 for two values of K.

In the example shown in FIG. 2(a), $K = 1.25$ and the densities of the elemental areas, and the relative intensities of transmitted light at photometric balance are as follows:

|  | $A_1$ | $A_2$ | $A_3$ | $B_1$ | $B_2$ | $B_3$ |
|---|---|---|---|---|---|---|
| Density | 0.6 | 0.2 | 0 | 0 | 0.2 | 0.6 |
| Relative intensity | 0.25 | 0.625 | 1 | 1 | 0.625 | 0.25 |

From the above chart it can be seen that the relative intensities of transmitted light at photometric balance in relation to the composition areas are:

|  | $AB_1$ | $AB_2$ | $AB_3$ |
|---|---|---|---|
| Relative intensity | 1.25 | 1.25 | 1.25 |

This assumes of course that the percentage of light reflected by the partial mirror is the same as the percentage of light transmitted. Thus, only when the diffusers are photometrically balanced will the brightness of composite areas $AB_1$ and $AB_2$ and $AB_3$ be equal, a situation easily and accurately determinable by the observer. When diffuser 13 is brighter than diffuser 14, area $AB_1$ will be darker than $AB_2$. However, the relative brightness of these areas reverses on passing through photometric balance as is illustrated in the drawing. As to area $AB_3$, it is the brightest of the three areas when diffuser 13 is brighter, but the darkest of the three areas when diffuser 14 is brighter.

The effect of having the transmission densities of like elemental areas of the two patterns not related in accordance with Eq. 4 to the transmission densities of adjacent like areas is illustrated in FIG. 2(b). Here, areas $A_1$, $A_2$, $B_1$ and $B_2$ are the same as in FIG. 2(a), but the transmission density of each of $A_3$ and $B_3$ is 0.6. In this case, composite area $AB_3$ is always the darkest regardless of the polarity or magnitude of photometric imbalance. From these simple examples, it can be seen that a given composite elemental portion of the composite pattern can be caused to contrast with surrounding portions at photometric balance by selecting values of densities of the elemental portions of the two patterns that define the given composite portion such that the values fail to satisfy Eq. 4 where the magnitude of K is established by the densities of the elemental portions that define the portion of the composite pattern surrounding the given portion. An example of two fixed patterns which cause an index symbol (the letter "Y") to be uniquely intelligible in the field of view of observer 16 at photometric balance is shown at FIGS. 4(a) and (b).

Figure 4:
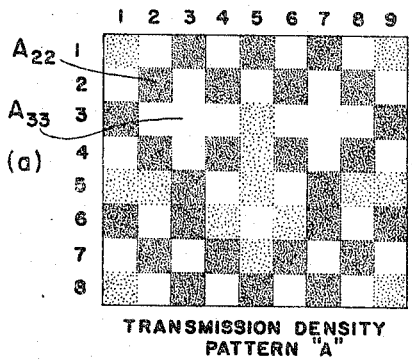
Figure 4:
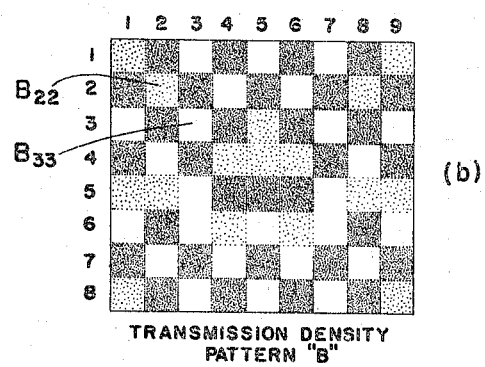
Figure 4:
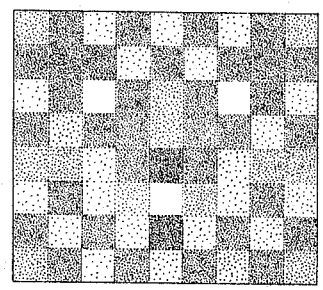
Figure 4:
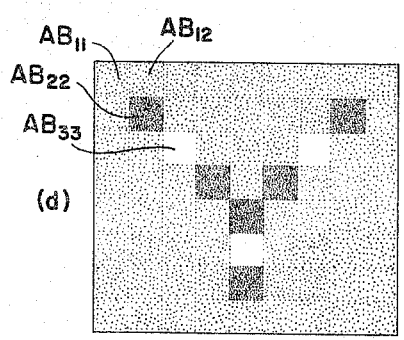
Figure 4:
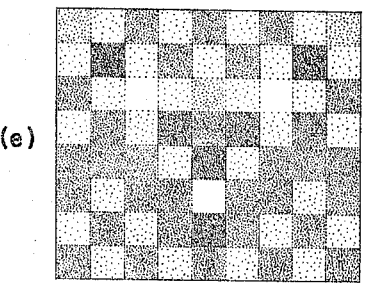

For simplicity, only two different transmission densities are utilized, namely 0.6 and 0.2, for each of patterns A and B at FIGS. 4(a) and (b), resulting in $K = 1.25$. The two upper left portions of the index are defined by composite areas $AB_{22}$ and $AB_{33}$, where the subscripts refer to the row and column, respectively, of the elemental areas in registration. The transmission densities of areas $A_{22}$ and $B_{22}$ are 0.6 and 0.2 respectively; and the transmission densities of areas $A_{33}$ and $B_{33}$ are each 0.0. Therefore, at photometric balance (and a partial mirror that reflects and transmits the same percentage of incident light), the intensity of light seen by an observer at $AB_{22}$ and $AB_{33}$ relative to the intensity of incident light is 0.875 and 2 respectively. The background against which the index is intelligible at photometric balance includes composite area $AB_{11}$, $AB_{12}$, etc. The transmission densities of $A_{11}$ and $B_{11}$, as with all the elemental areas that are in individual registration and which define the background, satisfy Eq. 4 with $K=1.25$. Thus, the transmission density of each of elemental areas $A_{11}$ and $B_{11}$ is 0.2 while the densities of $A_{12}$ and $B_{12}$ are 0.0 and 0.6 respectively. As indicated previously, at photometric balance the relative intensity of light seen by an observer at each of areas $AB_{11}$ and $AB_{12}$ relative to the intensity of incident light is 1.25. In other words, at photometric balance, composite area $AB_{22}$ is darker, and area $AB_{33}$ is lighter, than the background, of which $AB_{11}$ and $AB_{12}$ are representative. When the uniformly illuminated sources associated with each of the patterns are in photometric balance, the overall composite pattern seen by an observer using the arrangement shown in FIGURE 1 is shown in FIG. 4(d). When the source associated with pattern "A" is brighter than the soure associated with pattern "B," an observer sees a composite pattern like that shown in FIG. 4(e), where the index symbol, although still visible, is unintelligible because of the confusing background. When the polarity of the imbalance is reversed, a composite pattern like that shown in FIG. 4(c) occurs with the result that the index symbol is again unintelligible. Because of the precision with which the brightness of adjacent surfaces can be compared, a small perturbation to the photometric balance which discernibly alters the background of the composite pattern will provide a clear indication to the observer that an imbalance is present. Hence, while the index may be intelligible at a small imbalance, it is not uniquely intelligible when one considers the term "index" to include, not only the symbol, but the background on which the symbol is seen. Therefore, photometric balance is considered to occur only when the symbol appears against a uniform background. The symbol is then termed "uniquely intelligible."

In view of the above, it will be apparent to those skilled in the art that any index symbol can be defined at photometric balance by properly selecting the fixed transmission density patterns associated with each source. Furthermore, intelligibility can be caused to occur at any polarity and magnitude of photometric imbalance merely by insuring that at the desired imbalance, the fixed patterns are chosen to cause the symbol to be uniquely intelligible. For example, if the densities of areas of pattern A which have a transmission density different from zero were halved, the symbol "Y" would appear when the two sources were not equally bright, and the composite picture seen at photometric balance would be similar to that shown at FIG. 4(e). When the source associated with pattern A were less bright than the source associated with picture B by a factor of about 50%, the index symbol shown in FIG. 4(d) would become uniquely intelligible, thus positively indicating the desired degree of photometric imbalance has been achieved.

Instead of making the index a part of each of the two patterns, each of the latter may define "checkerboards" or other nonintelligible patterns whose densities satisfy Eq. 4. In such case, a checkerboard or the like would be visible at either side of photometric balance, and only there, would a field of uniform brightness be visible. When a separate transparent support on which the index is defined in terms of a density pattern is superposed on either or both of the two patterns, such index would be unintelligible when the sources are not in photometric balance because of the checkerboard pattern that results. However, at photometric balance, the field would be uniformly illuminated and the index would then become uniquely intelligible.

Figure 5:
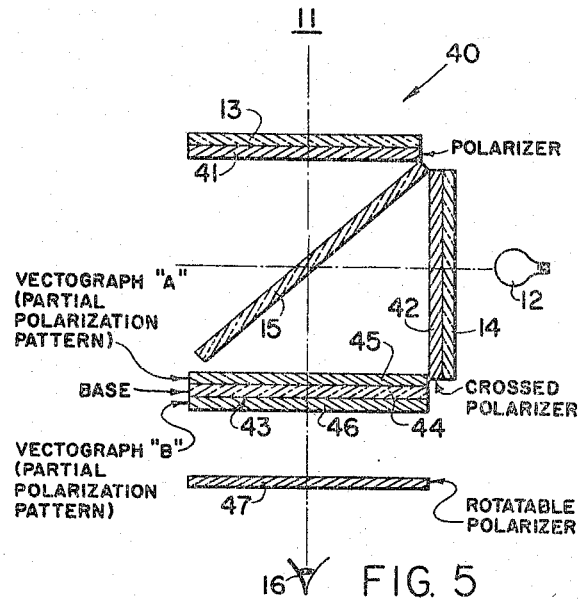

Referring now to FIG. 5, embodiment 40 utilizes direction of vibration in order to project, independently, light from each of two sources into the observers' field of view. Again, light from scene source 11 illuminates diffuser 13 and light from reference source 12 illuminates diffuser 14, but no adjustable diaphragm for controlling the relative brightness of the diffusers is necessary. Partial mirror 15, placed 45° relative to the two diffusers permits the observer at 16 to view diffuser 13 through neutral polarizer 41 and diffuser 14 through neutral polarizer 42. Polarizers 41 and 42 are oriented so that their directions of polarization make an angle of 90°. Between the observer and the mirror is placed a double-vectograph 43 which comprises transparent base material 44 sandwiched between vectograph layer 45 and vectograph layer 46. Before explaining the nature of layers 45 and 46, it may be well to point out that a vectograph of a scene reproduces the light and shade of the latter in terms of oriented partial polarization such as half-tones reproduce light and shade for printing. The light portions of the vectograph are not polarizing. The darker portions are more polarizing, reproducing various shades of gray. The black portions are completely polarizing. As a result, when an observer views a vectograph through a polarizer crossed with the direction of polarization of the vectograph the scene appears in proper shades of gray. However, the dark portions of the scene appear quite light when viewed through a polarizer parallel with the direction of polarization of the vectograph such that the scene essentially disappears.

Returning now to vectograph layers 45 and 46, the reasons for having polarized 41 crossed with polarizer 42 can now be appreciated, since the alignment of the direction of polarization of vectograph 45 with the direction of polarization of polarizer 41 and the alignment of the direction of polarization of vectograph 46 with the direction of polarization of polarizer 42 permits patterns contained in the two vectographs to be illuminated independently by each source.

Figure 6:
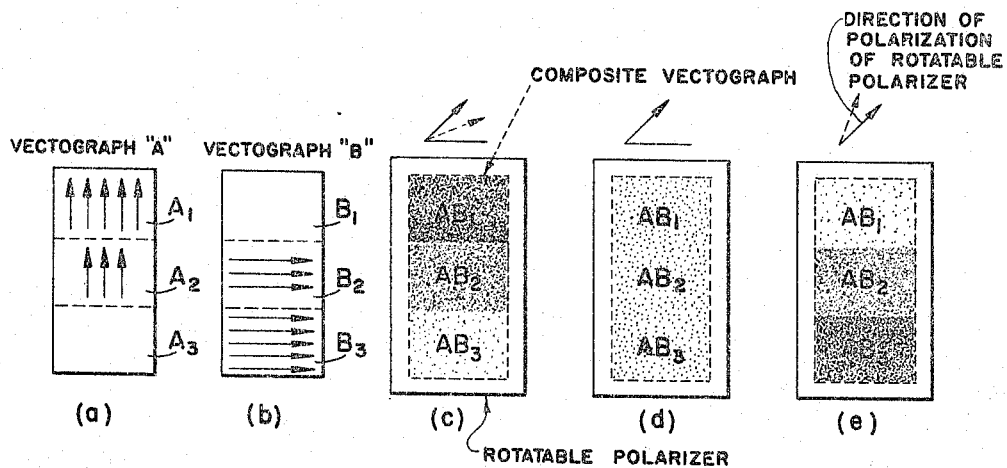

To understand the operation of this embodiment, reference is now made to FIG. 6 which at (a) and (b) shows two vectographs wherein the density of arrows indicates the degree of polarization and the direction of the arrows the orientation of the polarization. FIG. 6(a) would result from a scene like that shown by pattern "A" in FIG. 2(a); and FIG. 6(b) would result from a scene like that shown in pattern "B" in FIG. 2(a). Assume that vectograph layer 45 is like that shown in FIG. 6(a) with the direction of polarizer 41 parallel with the orientation of polarization of the vectograph; and the vectograph layer 46 is like that shown in FIG. 6(b) with the direction of polarization crossed relative to polarizer 41 and parallel with the orientation of polarization of the vectograph. With rotatable polarizer 47 oriented so that its direction of polarization is 45° to the direction of polarization of each vectograph, the three possible conditions of relative brightness as between the two sources is shown in FIGS. 6(c), (d) and (e). In FIG. 6(c), diffuser 13 is brighter than diffuser 14 and composite area $AB_1$ (as seen by the observer) is darker than composite area $AB_2$. Area $AB_2$ is darker than area $AB_3$. To render all three areas in the same brightness, it is necessary to rotate polarizer 47, through which the vectograph is viewed, clockwise as seen in FIG. 6(c) until its direction of polarization is aligned with the broken-line arrow.

FIG. 6(d) results when the diffusers are of equal brightness; all of the composite areas have the same brightness. In FIG. 6(e), diffuser 13 is less bright than the diffuser 14 with the result that the areas can be made equally bright by rotating the polarizer, counterclockwise as seen in FIG. 6(e), until its direction of polarization is aligned with the broken-line arrow. It is apparent then, that the angular position of the rotatable polarizer at which the composite areas are made equally bright provides an indication of relative brightness of the two sources. One photographic application of this embodiment involves calibration of the angular position of the rotatable polarizer in exposure-values since one of the light sources can be a standard. Another application may involve the coupling of the rotatable polarizer to the shutter control mechanism for changing either the exposure time or exposure aperture.

While the two vectographs in embodiment 40 could be based on the patterns shown in FIGS. 4(a) and (b) wherein the index is a part of the two patterns, it is also possible to make the index independent of the patterns. In such case, the two vectographs could define checkerboards or other unintelligible patterns such that at some given angular position of polarizer 47, the checkerboard pattern would disappear and the field would be uniformly bright. When the transparent base on which the vectographs are mounted contains an index in terms of an ordinary density pattern (not polarized), such index would become intelligible only at the precise angular position of the rotatable polarizer at which the checkerboard pattern disappears and the field is uniformly illuminated except for the index.

Figure 7:
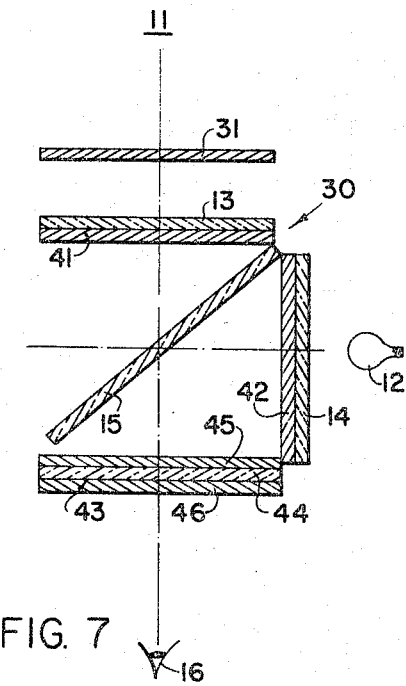
FIG. 7 is a modification of the device shown in FIG. 5.

A modification of the embodiment shown in FIG. 5, which is particularly well adapted for use as a camera photometer, is illustrated in FIG. 7. Embodiment 30 differs from embodiment 40 shown in FIG. 5 only by the absence of a rotatable polarizer between observer 16 and double-vectograph 43, and the presence of rotatable polarizer 31 interposed between scene source 11 and polarizer 41. Rotation of polarizer 31 from an angular position at which its direction of polarization is aligned with the direction of polarization of polarizer 41, will selectively decrease the intensity of light reaching diffuser 13 from the scene source such that at some angular position of polarizer 31, diffusers 13 and 14 will be in photometric balance. When each of vectograph layers 45 and 46 define suitable patterns similar to that illustrated in FIGS. 4(a) and (b) respectively, observer 16 will see a composite pattern defined by the superposition of the patterns on each of the two vectograph layers rendered in terms of contrasting intensities of light. As previously described, a suitable index symbol will become uniquely intelligible only when diffusers 13 and 14 are in photometric balance. Thus, the angular position of polarizer 31 is a measure of the intensity of scene source 11 relative to reference source 12 and can be used to indicate the absolute value of the intensity of the scene source by proper calibration. Inasmuch as vectograph layers 45 and 46 are superposed the density patterns associated with each layer will be arithmetically additive and some adjustment in the relative values of density shown in FIGS. 4(a) and (b) will be necessary in order to render the index symbol uniquely intelligible at photometric balance. Again, the vectograph patterns may be such as to cause the field to be uniformly illuminated at photometric balance; and the index symbol, defined in terms of an ordinary density pattern on a separate transparent support superposed with the vectograph, would be uniquely intelligible only at photometric balance since the index would be camouflaged by the checkerboard patterns at photometric imbalance.

A still further embodiment of the invention involves the use of frequency discrimination to project, independently, light from two sources into a common field of view. In embodiment 60 of FIG. 8, sheets 17 and 18 are replaced by sheets 61 and 62 each of which may have a plurality of translucent red and green dots. The dots may be arranged on the sheets such that there is a red dot on sheet 61 at the same place there is a green dot on sheet 62, etc. When an observer views partial mirror 15 through yellow filter 63 that matches the red and green, the dots on each sheet will be in registration and the composite dots will turn yellow and appear to disappear only when the two diffusers are of equal brightness. When the diffusers are out of photometric balance, the composite dots will appear reddish or greenish depending upon the polarity of imbalance. By providing dots on the sheet having other than an inverse arrangement and with various degrees of saturation, it is possible to produce a balance, an intelligible index in both reddish and greenish dots against a yellow background, and at imbalance, a confusing pattern of colored dots that effectively conceals the index. In this case too, the index could be made separate from the sheets and be defined in terms of color on a transparent support. At photometric balance, the sheets would cooperate as previously described to render the background in monochromatic light, against which the index would be uniquely intelligible.

Figure 9:
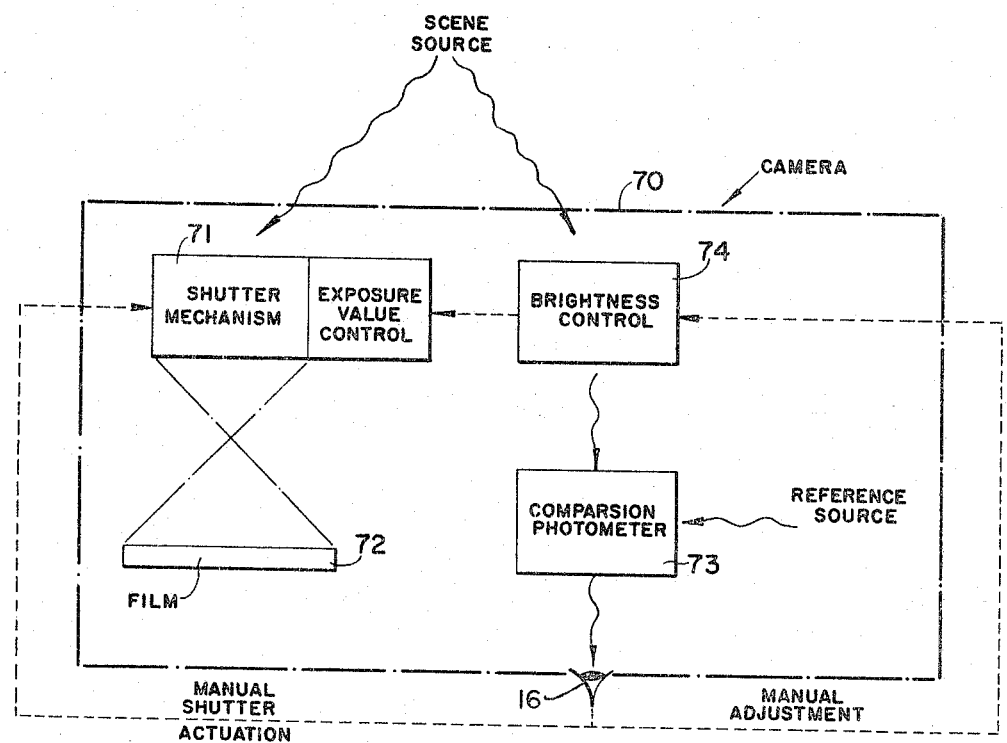
FIG. 9 is a schematic illustration showing the incorporation of a photometer constructed in accordance with the present invention incorporated into a camera for the purpose of achieving semiautomatic operation thereof.

A schematic illustration of a camera utilizing a photometric device of the type described above, wherein a positive visual indication is provided to an observer when photometric balance is achieved, is shown in FIG. 9. Camera 70 includes shutter mechanism 71 having an exposure value control which determines the amount of light from a scene source which is permitted to expose film 72 when the shutter mechanism is manually actuated by observer 16. Observer 16 views a reference source and a scene source in a common field as established by comparison photometer 73. However, light from the scene source passes through brightness adjustment 74, the latter being manually coupled to the exposure value control of the shutter mechanism. For example, the shutter speed and/or diaphragm opening could be controlled by operation of brightness adjustment 74. Photometer 73 may take the form shown in FIG. 7 wherein rotatable polarizer 31 constitutes the brightness adjustment referred to above. In such case the observer would rotate polarizer 31 until the index symbol associated with double-vectograph 43 becomes uniquely intelligible, and provides a positive indication that the intensity of the scene source bears a fixed relationship to the reference source. Since the exposure value control can be correlated to the speed of the film being used, observer 16 can then operate shutter mechanism 71 after the index symbol is made uniquely intelligible with assurance that the film will be properly exposed.

Figure 10:
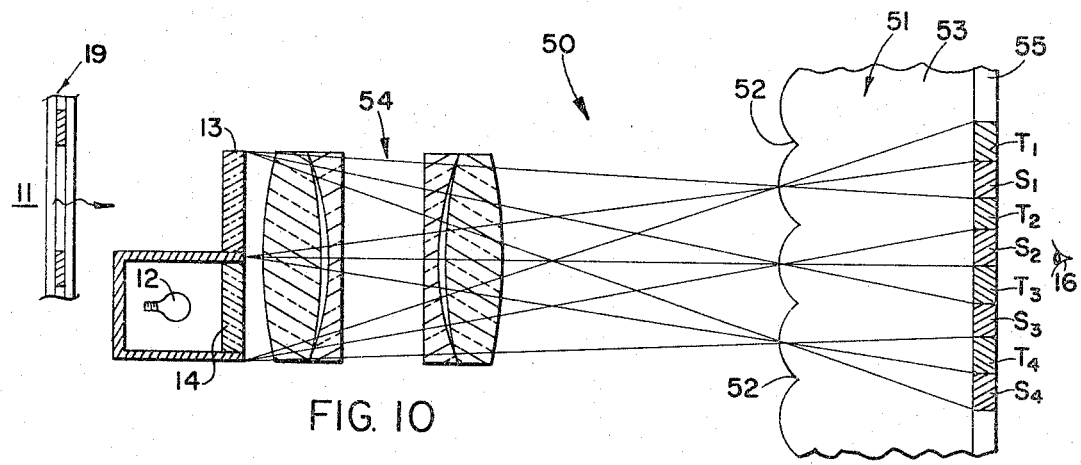
FIG. 10 is a schematic view of still another embodiment of the present invention in which a pair of patterns individually associated with each of two light sources is selectively illuminated by means of optical geometry which includes a lenticular screen.
Figure 11:
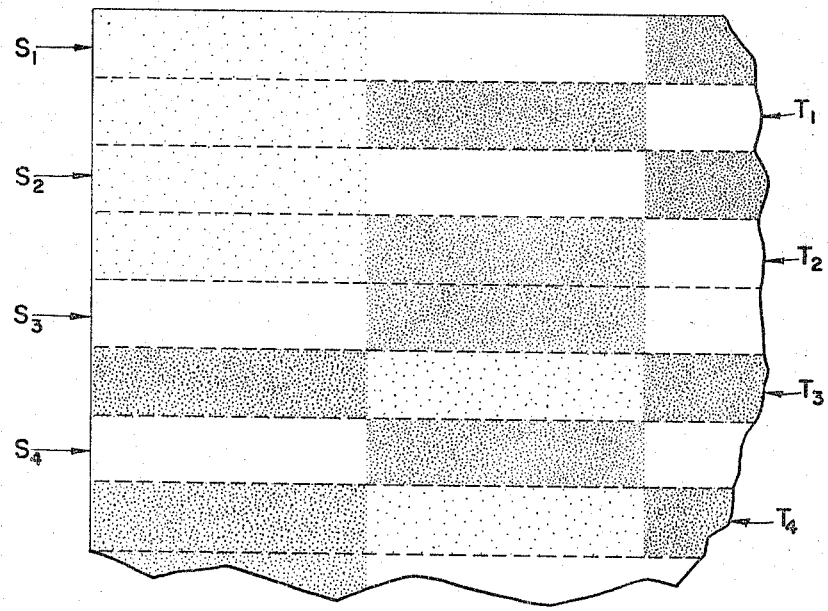
FIG. 11 is an enlarged section of the strip pattern shown in FIG. 10, as viewed from the position of the eye shown in FIG. 10.

Still another embodiment of the invention wherein optical geometry is utilized to project, independently, light from two sources into a common field is illustrated at 50 in FIG. 10. Embodiment 50 is the joint invention of Edwin H. Land, the sole inventor of the device defined by the claims of this application, and W. H. Ryan; and is disclosed and claimed in copending application Ser. No. 359,109, filed Apr. 13, 1964. Diffuser 13 associated with scene source 11 provides a first source of light of uniform brightness that illuminates strips $S_1, S_2$ . . . on lenticular film 51 as seen by an observer at 16. Diffuser 14, associated with reference source 12 provides a second source of light of uniform brightness that illuminates strips $T_1, T_2$ . . . on film 51. As is well known by those skilled in the art, the provision of continuous grooves 52 on the emulsion support 53 defines a plurality of small cylindrical lenses such that a lens system 54 interposed between support 53 and the diffusers 13 and 14 and focused on emulsion 55 will cause two interlaced but independent images to be formed on the emulsion. Where the grooves 52 are small enough, an observer sees on emulsion 55 superimposed images of the two diffusers. If emulsion 55, rather than diffusers 13 and 14, defines two interlaced transmission density patterns in proper relative position, a photometric device is achieved. For example, the strips $S_1, S_2$ . . . could define the density pattern shown at FIG. 4(a) and the strips $T_1, T_2$ . . . could define the density pattern shown at FIG. 4(b). An enlarged section of the emulsion would appear to an observer as shown in FIG. 11 wherein only the four upper left squares of the two patterns in FIGS. 4(a) and (b) are shown. Each square is divided into four strips, two of which are contributed by each of the two density patterns. This construction is, of course, chosen to facilitate illustration of the principles involved, it being understood that the spacing of the strips can be selected such that the interlaced nature of the image is not apparent to a viewer. Thus, observer 16 viewing emulsion 55 would see the patterns of FIGS. 4(a) and (b) in superposition. When the brightness of diffuser 13 is greater than the brightness of diffuser 14, an observer would see the composite pattern shown in FIG. 4(c). However, when the diffusers are made equally bright by selective adjustment of diaphragm 19, the composite pattern shown in FIG. 4(d) is seen. This embodiment represents a substantial simplification over the embodiments shown in FIGURE 1, for example, primarily because the lenticular film serves the dual purpose of combining independent light sources and providing a pattern by which an index can be rendered visible at photometric balance if this is desired. The sources illuminating the film, of course, do not contain patterns but are uniformly illuminated.

The previous discussion relates to an index which is a part of the two density patterns which are formed in interlaced relationship on the emulsion of the film. However, the index can be made separate from the pattern. In such case, the two density patterns may define a checkerboard or other nonintelligible pattern which disappears at photometric balance providing a field which is of uniform brightness. Causing an index rendered in terms of density to also be present in the field of view will result in the index becoming uniquely intelligible at photometric balance and being unintelligible due to the confusing patterns present at imbalance. The index can be present in the field by providing a transparent support, whereon the index is rendered in terms of density, positioned on either or both the diffusers, or positioned on the film. Alternatively, the index can be printed directly on the emulsion.

Still another embodiment of the invention is illustrated at 70 in FIG. 12. Embodiment 70 is the joint invention of Edwin H. Land, the sole inventor of the device defined by the claims of this application, and Dexter P. Cooper; and is disclosed and claimed in copending application Ser. No. 359,113, filed Apr. 13, 1964. Light from scene source 11, controllable by diaphragm 19, illuminates diffuser 13'; and light from reference source 12 illuminates a reflecting pattern partially covering one side of diffuser 13' facing observer 16, as well as sheet 14' which is superposed relative to the diffuser between the latter and the observer at 16. Diffuser 13' may take the form of a transparent sheet 71, one surface (the one facing source 11) of which is specially treated (e.g., by embossing lenticules thereon) to cause light from source 11 to be scattered on transmission through sheet 71 in order to define a substantially uniformly illuminated background; and the other surface of which is provided with pattern elements 72 printed or otherwise affixed thereto. Pattern elements 72 are rendered in a highly reflective material, such as white paint, which will efficiently reflect light from source 12 into the eye of the observer at 16. Sheet 14', on the other hand is transparent but is provided with an index symbol, shown in the drawing as the word "yes," rendered visible on the transparent sheet in a low density tone. Observer 16 views the index symbol superimposed on the pattern elements 72 which the drawing shows as a regular checkerboard array with the word "no" superimposed thereon. However, the pattern could also be irregular or random, the essential feature being that it must camouflage the index except under the conditions noted below.

Pattern elements 72 will appear dark against a light background when the scattered light from source 11 passing through the interstices of the pattern elements is brighter than the light from source 12 reflected from the elements. In such case, the indicia "no" would be apparent to an observer and the index symbol, while visible, would not be intelligible. When diaphragm 19 attenuates the light from source 11 to the extent that the scattered light passing through the interstices of the pattern is less bright than the light from source 12 reflected from the element, they will appear bright against a dark background. Again the indicia "no" will be apparent and the index symbol will be camouflaged. At some intermediate adjustment of diaphragm 19, the brightness of light passing the interstices will equal the brightness of light reflected by the pattern, and the latter will disappear from view as the entire field will appear uniformly illuminated, except for the index "yes" which will then become uniquely intelligible.

When the index symbol is applied to the diffuser and the pattern is applied to the transparent screen, the operation is essentially as above described. However, at photometric balance, the index symbol will be obscured somewhat by the portion of the pattern covering the symbol, since the pattern in this case is between the observer and the diffuser.

Figure 13:
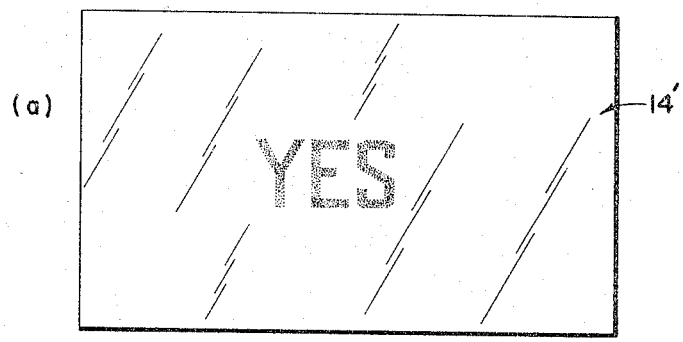
Figure 13:
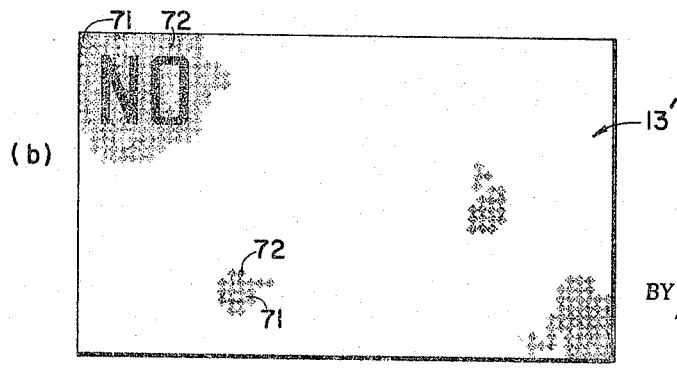

The last-described embodiment is illustrative of the alternative arrangements of the embodiments of FIG. 1, FIG. 5, FIG. 7, and FIG. 8 wherein the uniformly illuminated background containing an index symbol rendered visible by its contrast with the background area, FIG. 13(a), constitutes one of the pair of "patterns" referred to previously; and the group of elemental areas of 72 rendered in light reflecting material illuminated by light source 12, FIG. 13(b), constitutes the other of the pair of patterns. The two "patterns" shown in FIG. 13 could be used with the beam-splitter arrangement of FIGURE 1 except that the reflection pattern rendered by areas 72 in FIG. 13 would have to be rendered in terms of transmission densities. Likewise, the vectograph embodiments of the invention shown in FIGS. 5 and 7 could include reproductions of the patterns of FIG. 13, etc.

Figure 8:
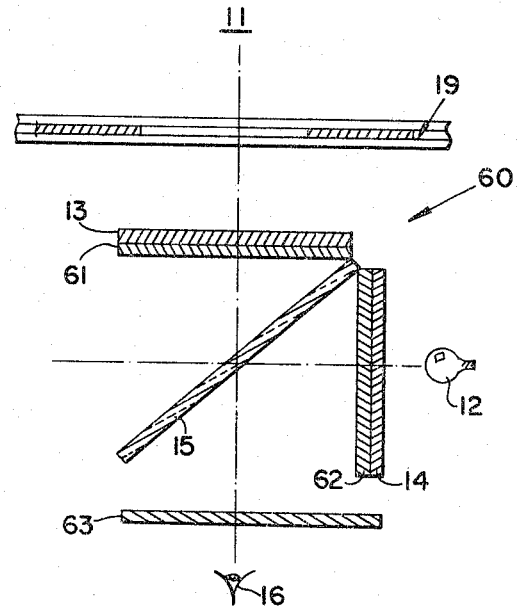
FIG. 8 is an embodiment of the present invention in which a pair of patterns individually associated with two light sources are separately illuminated by selecting different frequencies of light from each source.

Since it is well known that brightness comparison is facilitated under monochromatic conditions, a relatively long wavelength (i.e., reddish) filter can be interposed in the field of view of the observer in all of the embodiments except that shown in FIG. 8.

Since certain changes may be made in the above apparatus without departing from the scope of the invention herein involved, it is intended that all matter contained in the above description or shown in the accompany drawings shall be interpreted as illustrative and not in a limiting sense.

What is claimed is:

1. A photometric device by which the brightness of two light sources can be compared comprising:
   means defining a field of view containing an index symbol and a background pattern of discrete areas for said symbol, said symbol and the discrete areas of said background pattern being constructed and arranged to render said symbol as the dominant perceptible element in said field of view when the background pattern exhibits a relatively low brightness contrast and to render said pattern as the dominant perceptible element in said field of view when the background pattern exhibits a relatively high brightness contrast; and
   means for differentially illuminating the discrete areas of said background pattern with light from said two sources and for adjustably varying the relative proportions of light incident on said pattern from said sources to alter the brightness contrast between the discrete areas of said background pattern,
   whereby the perceptibility of said index symbol is suppressed by the dominance of said background pattern when the latter exhibits a relatively high contrast, but becomes uniquely perceptible against said background pattern when the contrast of said background pattern areas is low at substantial photometric balance.

2. Apparatus in accordance with claim 1 wherein at least a portion of the first-mentioned means is defined in contrasting colors.

3. Apparatus in accordance with claim 1 wherein said index symbol is defined in contrasting levels of brightness.

4. Apparatus in accordance with claim 1 wherein the discrete areas of said background pattern are rendered in terms of transmission densities.

5. Apparatus in accordance with claim 1 wherein the discrete areas of said background pattern are rendered in terms of degree of polarization.

6. Apparatus in accordance with claim 1 wherein means are provided for viewing said field of view through an essentially monochromatic filter.

7. A photometric device by which the brightness of two light sources can be compared comprising:
means defining two elements capable of being made visible in a field of view, one of said elements constituting an index symbol and the other of said elements forming a pattern of interdigitated discrete areas as a background for said symbol, said symbol and said pattern of discrete areas being constructed and arranged to render said symbol as the dominant perceptible element when the background pattern exhibits a low brightness contrast relative to said index symbol and to render said pattern as the dominant perceptible element when said pattern exhibits a high brightness contrast relative to said index symbol; and
means for differentially illuminating the interdigitated discrete areas of said background pattern with light from said two sources and for adjustably varying the relative proportions of light incident on said pattern from said sources to alter the brightness contrast between the discrete areas of said background pattern, whereby the perceptibility of said index symbol is suppressed by the dominance of said background pattern when the latter thereof exhibits a relatively high contrast, but becomes uniquely perceptible against said background pattern when the brightness contrast between the discrete areas of said background pattern at substantial photometric balance is low.

8. A photometric device by which the brightness of two light sources can be compared comprising:
means defining an index symbol and a pattern of discrete areas forming a background for said symbol in a field of view, said index symbol and said pattern being constructed and arranged to render said symbol perceptible against said background pattern in terms of differences in brightness between said symbol and said discrete areas;
means for differentially illuminating said discrete areas of said background pattern with light from said two sources, thereby rendering said discrete areas in contrasting levels of brightness to suppress the apparent differences in brightness between said symbol and said background pattern;
means for varying the relative proportions of light incident on said pattern from said sources to effect a photometric balance in brightness between said discrete areas, thereby causing said index symbol to be uniquely intelligible against said background only at substantial photometric balance and, at photometric imbalance, suppressing the intelligibility of said symbol by virtue of the contrasting levels of brightness of said discrete areas.

9. A photometric device by which the brightness of two light sources can be compared comprising:
means defining an index symbol against a background pattern of discrete areas in a field of view, said symbol and said pattern being constructed and arranged to render said symbol differentiable from said background pattern in terms of contrasting levels of brightness of said symbol and said discrete areas;
means for causing said discrete areas of said background pattern to be differentially illuminated by light from said two sources, thereby rendering said discrete areas in contrasting levels of brightness to suppress the apparent differences in brightness between said symbol and said background pattern;
means for varying the relative proportions of light incident on said pattern from said sources to effect a photometric balance between the brightnesses of said discrete areas, thereby causing said index symbol to be uniquely intelligible in said field of view only at photometric balance and, at photometric imbalance, suppressing the intelligibility of said symbol by virtue of the contrasting levels of brightness of said discrete areas.

10. In a photometric device by which the brightness of two sources can be compared, the combination of:
(a) a pair of patterns;
(b) means for causing said patterns to be individually associated with each of said two sources;
(c) viewer means by which light from each of said sources can be viewed simultaneously in registration through the pattern which is associated with each source to define a composite pattern;
(d) means for selectively varying the relative brightnesses of said sources; and
(e) said pair of patterns being constructed and arranged so as to cooperate with said sources in response to variation of the relative brightnesses of said sources for causing said composite pattern to define, in terms of contrasting levels of brightness, an index symbol that is intelligible when the brightness of said sources is equal and is unintelligible when the brightness of said sources is not equal.

11. Apparatus in accordance with claim 10 wherein said viewer means includes a partial mirror.

12. Apparatus in accordance with claim 11 wherein said patterns are in terms of transmission densities, and each of said pair of patterns is interposed between said mirror and one of said sources.

13. Apparatus in accordance with claim 11 wherein said patterns are in terms of partial polarization, said pair of patterns are superposed.

14. In a photometric device by which the brightness of two sources can be compared, the combination of:
(a) a partial mirror mounted so that each of said two sources can be viewed simultaneously;
(b) a linear polarizer interposed between the mirror and each of said two sources oriented such that the direction of polarization of the light from one source is normal to the direction of polarization of the light from the other source;
(c) a first layer having a pattern thereon defined in terms of partial polarization the direction of which is parallel to one of said linear polarizers;
(d) a second layer superposed on said first layer and having a pattern thereon defined in terms of partial polarization and in registration with the pattern on said first layer, the direction of polarization of the pattern on said second layer being parallel to the other of said linear polarizers; and
(e) means mounting said first and second layers so that said sources are viewable therethrough.

15. Apparatus in accordance with claim 14 wherein the composite pattern defined by the superposition of the patterns on said first and second layers is rendered in terms of contrasting intensities of light such that an index symbol is uniquely intelligible only when a predetermined magnitude and polarity of photometric imbalance exists between said two sources.

16. Apparatus in accordance with claim 15 wherein the magnitude of imbalance is zero.

17. A photographic camera having an exposure aperture for photographing a field of view comprising:
adjustable exposure control means for varying the amount of light admitted through the exposure aperture of said camera during an exposure;
a reference light source;

means defining a field of view containing an index symbol and a background pattern of discrete areas for said symbol, said index symbol and the discrete areas of said background pattern being constructed and arranged to render said symbol as the dominant perceptible element in said field of view when the background pattern exhibits a low brightness contrast and to render said pattern as the dominant perceptible element in said field of view when the background pattern exhibits a high brightness contrast;

means for differentially illuminating the discrete areas of said background pattern with light from said reference light source and from a source of light derived from said field of view;

means responsive to the adjustment of said exposure control means for adjustably varying the relative proportions of light incident on said pattern from said sources to alter the brightness contrast between the discrete areas of said background pattern, the perceptibility of said index symbol being suppressed by the dominance of said background pattern when the latter exhibits a relatively high contrast at incorrect settings of said exposure control means, but becomes uniquely perceptible against said background pattern when the contrast of said background pattern areas is low at correct settings of said exposure control means.

References Cited

UNITED STATES PATENTS

| | | | |
|---|---|---|---|
| 2,112,701 | 3/1938 | Leitz | 95—10 |
| 2,195,640 | 4/1940 | Bing | 88—23 |
| 2,246,817 | 6/1941 | Sauer | 88—23 |
| 2,333,759 | 11/1943 | Akelaitis | 95—10 X |
| 2,649,017 | 8/1953 | McCarty | 88—23 |

NORTON ANSHER, *Primary Examiner.*

J. F. PETERS, Jr., *Assistant Examiner.*

UNITED STATES PATENT OFFICE
CERTIFICATE OF CORRECTION

Patent No. 3,323,431 June 6, 1967

Edwin H. Land

It is hereby certified that error appears in the above numbered patent requiring correction and that the said Letters Patent should read as corrected below.

Column 1, line 64, for "discription" read -- description --; line 68, for "from" read -- form --; column 2, line 13, after "with" insert -- the --; column 3, formula "(1)" should appear as shown below instead of as in the patent:

$$t_A = \frac{(I_i)_A}{10^{D_A}}$$

line 73, formula "(2)" for the lower portion of the formula reading $$= I_i \left( \frac{1}{10D_A} + \frac{1}{10D_B} \right) \text{ read } = I_i \left( \frac{1}{10^{D_A}} + \frac{1}{10^{D_B}} \right)$$

column 4, formula "(3)" for that portion of the formula reading $$\frac{1}{10D_A} + \frac{1}{10D_B} = K \quad \text{read} \quad \frac{1}{10^{D_A}} + \frac{1}{10^{D_B}} = K$$

formula "(4)" for that portion of the formula reading $$D_A = D_B - \lg[K10D_B - 1] \quad \text{read} \quad D_A = D_B - \lg[K \cdot 10^{D_B} - 1]$$

same column 4, line 25, for "composition" read -- composite --; column 5, line 23, for "soure" read -- source --; column 6, line 32, for "polarized" read -- polarizer --; line 47, for "in", first occurrence, read -- by --; column 8, line 4, for "a" read -- at --.

Signed and sealed this 9th day of January 1968.

(SEAL)
Attest:

EDWARD M. FLETCHER, JR.
Attesting Officer

EDWARD J. BRENNER
Commissioner of Patents